July 25, 1961 G. M. ANDERSON 2,993,960

DIAL PULSE RESTORER

Filed June 6, 1957 2 Sheets-Sheet 1

INVENTOR
George M. Anderson
BY George H. Fritzinger
Agt.

July 25, 1961 G. M. ANDERSON 2,993,960

DIAL PULSE RESTORER

Filed June 6, 1957 2 Sheets-Sheet 2

INVENTOR
George M. Anderson
BY George H. Fritzinger
Agt.

United States Patent Office 2,993,960

Patented July 25, 1961

2,993,960

DIAL PULSE RESTORER

George M. Anderson, Whippany, N.J., assignor to McGraw-Edison Company, Elgin, Ill., a corporation of Delaware Filed June 6, 1957, Ser. No. 663,974
2 Claims. (Cl. 179—16)

This invention relates to apparatus for enabling a telephone subscriber to make connection between his station equipment and a remote dictating machine by a dialing operation and to thereupon control the machine by further selective dialing operations, and more particularly the invention relates to methods and apparatus for detecting the differential surges of original dial pulses which appear in completed voice frequency telephone lines and for producing there D.C. pulses corresponding to the original dial pulses to enable a positive and dependable control of the dictating machine.

In the present description the term "D.C. pulse" is used with reference to pulses characterized as having a substantially stable magnitude for a time duration, and the term "surge" is used with reference to pulses characterized as being sharply variable throughout their time duration.

In telephone apparatus direct current lines are provided between subscribers' stations and the central station so that the D.C. dial pulses can operate the switching relays as telephone numbers are dialed. However, there is interposed an isolating transformer or condenser between the voice frequency lines of the respective subscribers' stations. It is desirable when a dictating machine is added to a telephone system that it be connected in place of a standard subscriber's station so that efficient utilization is made of the telephone lines and switching apparatus. Such dictating machine must be controlled as to start-stop, indexing, playback, etc. This is done by selectively-operable stepping relays controlled by dial pulses from the subscriber's station as pre-selected numbers are dialed. However, the D.C. dial pulses at the subscriber's station are differentiated by the line transformer or condenser to produce only momentary surges of current in the completed telephone line where the dictating machine is connected. There is a pair of these momentary surges for each original dial pulse—a surge of one polarity at the leading edge of the pulse and a surge of opposite polarity at the trailing edge. These momentary surges do not contain sufficient energy to enable reliable operation of the control relays of the dictating machine. By the present invention an equipment is provided at the called station capable of detecting the differentiated surges of original dial pulses and of triggering a means for there producing D.C. pulses corresponding to the original pulses.

An object of my invention is to provide improved apparatus for reliably controlling dictating machines over voice frequency lines of telephone systems in response to D.C. pulses produced by selective dialing of numbers at a subscriber's station.

The present invention is in an electronic equipment which is capable of distinguishing between a dial pulse at the dictator's station and all other electrical currents—whether voice currents, noise, or other signals—and which when it senses a dial pulse at the subscriber's station will produce an equivalent D.C. pulse for controlling the dictating machine.

Dial pulses of telephone equipment have characteristically a many times greater magnitude than that of the speech signals and occur at a frequency of about 10 per second during the return of a dial to home position; however, the duration of individual pulses may vary widely from about 35 ms. to a maximum of about 80 to 90 ms.

Another object of my invention is to provide a dial pulse restorer which is responsive only to the differentiated surges of respective dial pulses occurring within a time interval not less than the minimum normal duration of standard dial pulses nor greater than the maximum duration thereof.

Another object is to provide such restoring equipment which is adapted to respond only to voltage surges of a magnitude substantially greater than that of the speech frequency components.

These and other objects and features of my invention will be apparent from the following description and the appended claims.

In the description of my invention reference is had to the accompanying drawings, of which:

Figure 1:
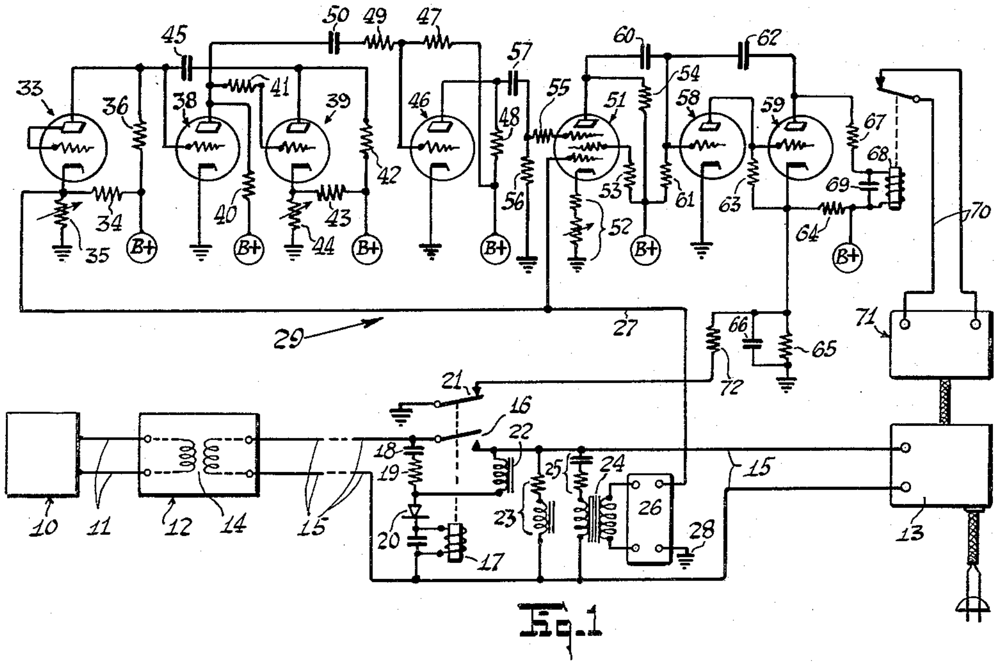
FIGURE 1 is a schematic circuit diagram of a combination telephone-dictation system showing a dial pulse restorer according to my invention.

In FIGURE 1 a standard subcriber's telephone station 10 of the dial type is connected through a D.C. circuit 11 to a central station 12 having the usual switching apparatus responsive to the dial pulses from the subscriber's station for making connection to selected subscribers' lines. Upon the calling party dialing the number assigned to the station whereat a dictating machine 13 is located, connection is made through a respective isolating condenser or transformer—a transformer being shown by way of example—to a corresponding voice frequency line 15. This line is normally held open by a switch 16, but upon receipt of ringing current a relay 17 connected across the line through condenser 18, resistor 19 and rectifier 20 is operated to close the switch 16 as well as to open a second switch 21 hereinafter explained. The closing of switch 16 completes connection of the relay 17 across the line through an inductor 22 to cause the relay to be held operated by the D.C. current in the line, and it completes also connection of the calling party through the line transformer to the dictating machine 13. Across the circuit 15 at the far side of the switch 16 is an RL terminating impedance 23. Also, the primary of a transformer 24 is connected across the line at this point through an RC impedance 25. This transformer feeds through a low-pass filter 26 and an output circuit 27 grounded at one end at 28 to the dial pulse restorer of my invention indicated at 29. For reasons which will appear, the transformer is connected to effect a 180° phase reversal of the currents fed to the dial pulse restorer.

Figure 2:
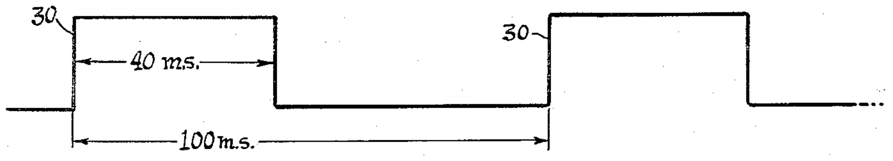
FIGURE 2 is a curve showing a series of D.C. dial pulses.
Figure 3:
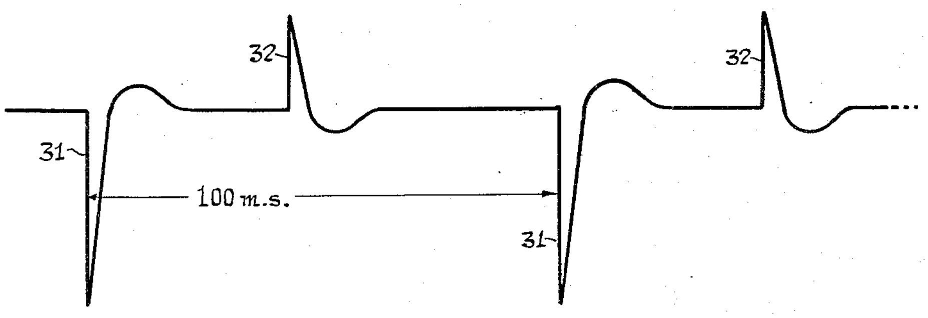
FIGURE 3 is a curve showing the differentiated voltage surges of successive dial pulses such as are fed to the dial pulse restorer of my invention.

Dial pulses produced at the subscriber's station when a number is dialed appear approximately as indicated at 30 in FIGURE 2. As is well known, on dialing number 1 or letters ABC, a single pulse of about 40 ms. is produced; on dialing number 2 or letters DEF, two such pulses are produced at intervals of about .1 second, etc. However, the isolating transformer 14 passes only the differentials of these dial pulses which appear as surges at the leading and trailing edge of each pulse. Since these surges undergo a phase reversal when fed through the coupling transformer 24, there is a negative surge 31 at each leading edge of a dial pulse and a positive surge 32 at each trailing edge thereof as shown in FIGURE 3.

The input circuit 27 to the restorer is connected to the cathode of a tube 33 operating as a rectifier. This cathode is biased positively by about 15 volts by means of a bleeder circuit including resistors 34 and 35 connected between B+ and ground. The plate of this tube is connected to B+ through a high resistance 36 of about 5 megohms, but is normally held positive by only a small voltage because of its being directly connected to the grid of an electron tube 38 operating in connection with a succeeding tube 39 as a multivibrator. Since the plate potential on the tube 33 is thus held negative with respect to the cathode potential, the tube is normally in a blocked condition. Thus, only an input voltage of negative sign and of a magnitude greater than the cathode bias will render the tube conductive. The leading differential surge of a dial pulse meets both of these conditions to cause the input tube 33 to be triggered into a conductive condition.

When the tube 33 is rendered conductive, its plate is drawn negative to reduce the grid voltage on the tube 38 to negative values and to place this tube in a blocked condition. The plate of tube 38 is connected to B+ through resistor 40 and is connected also to the grid of tube 39 through resistor 41. The plate of tube 39 is connected to B+ through resistor 42 but the cathode of this tube is biased heavily positive to render the tube normally blocked, the biasing being effected by a bleeder circuit including resistors 43 and 44 connected between B+ and ground. When the tube 38 becomes blocked its plate potential is increased to increase the grid voltage of tube 39 sufficiently to render this tube conductive. As soon as tube 39 starts this conductance its plate voltage is reduced to cause a voltage to be fed back through condenser 45 to further increase momentarily the negative voltage on the grid of tube 38 and to charge the condenser. But as the negative charge on the condenser 45 leaks off through resistor 36, the tubes 38 and 39 are restored to their initial conditions, which are a conducting condition for the tube 38 and a non-conducting condition for the tube 39. The time constant of the condenser 45 and resistor 36 is such that this restoration occurs in about 35 ms. after the instant the input tube 33 was triggered into a conductive condition. An effect therefore of feeding a momentary negative surge to the input tube 33 is to render the tube 39 conducting for a period of about 35 ms.—which is a period considered as being the minimum time duration for any standard dial pulse.

Following the multivibrator 38—39 is an electronic tube 46 having its cathode grounded, its grid connected through high resistor 47 of about 6 megohms to B+ and its plate connected through resistor 48 to B+. The grid of this tube is therefore held positive to render the tube normally conductive. The grid is however connected through resistor 49 and condenser 50 to the plate of the multivibrator tube 38. When at the end of the 35-ms. period abovementioned the tube 38 is restored to conductive condition, its plate voltage is shifted negative to pull the grid of the tube 46 negative through the circuit 49—50 and to render the tube 46 non-conducting. The time for the charge on condenser 50 to leak off through the high resistor 47 is set at about 70 ms. Thus, the tube 46 is held in a non-conducting condition for a period of about 70 ms. starting after a delay of about 35 ms. from the instant the input tube was triggered by the leading differential surge of a dial pulse.

Following the tube 46 is a multigrid detector tube 51 having its cathode connected through resistor 52 to ground, its first grid connected to the input line 27, its second grid and plate connected through respective resistors 53 and 54 to B+ and its third grid connected through resistors 55 and 56 to ground and through resistor 55 and condenser 57 to the plate of the preceding tube 46. During the 70-ms. period when the tube 46 is nonconducting, its plate potential is increased to place a positive potential on the grid 3 of tube 51. If now a positive differential surge is fed to grid 1 while grid 3 is held positive, the tube 51 is placed in a conductive state. It well therefore appear that the tube 51 is utilized as an electronic gate for sensing whenever a negative surge fed into the input tube 33 of the restorer is followed not less than 35 ms. later nor more than 105 ms. later by a positive surge. A dial pulse of a duration between these time limits will therefore trigger the tube 51 to render it conductive.

A momentary conductivity of tube 51 triggers a multivibrator including tubes 58 and 59. The tube 58 has its cathode grounded, its grid connected through condenser 60 to the plate of tube 51 and also through a high resistor 61 of about 1 megohm to B+ as well as through a condenser 62 to the plate of tube 59, and has its plate connected through a resistor 63 to the cathode of tube 59 and onwardly through a resistor 64 to B+. The cathode of the tube 59 is also connected through bias resistor 65 paralleled by condenser 66 to ground, and the plate of this tube is connected also through resistor 67 and coil of relay 68 in parallel with condenser 69 to B+. Resistors 64 and 65 form a bleeder circuit between B+ and ground for supplying positive voltage to the plate of tube 58. Since the tube 58 has its grid held positive but by lesser voltage, the tube is normally in a conductive state to produce a voltage drop across the resistor 63 the effect of which is to hold the grid of tube 59 negative with respect to its cathode and to render this tube normally nonconductive. When the tube 51 is rendered conductive its plate voltage falls to pull the grid of tube 58 negative through the coupling condenser 60 and to render this tube non-conducting. As the tube 58 is rendered non-conducting, its plate voltage rises to render tube 59 conducting and to operate the relay 68. As soon as the tube 59 begins conducting, its plate voltage is reduced to feed back a voltage through condenser 62 to keep the grid of tube 58 negative whereby to prolong the period over which tube 59 is kept conducting and the relay is kept operated. When the charge on the condenser 62 has leaked off through the high resistor 61, the tubes 58 and 59 are restored to their initial conditions to cause the relay 68 to drop out. The timing of the resistor 61 and condenser 62 is set at about 50 ms. Thus, when the detector tube 51 is momentarily rendered conductive by the simultaneous application of positive voltages on both its grid 1 and grid 3, a D.C. pulse is fed through the relay 68 to hold it operated for about 50 ms. This momentary operation of the relay responsive to the detection of a dial pulse opens a control circuit 70 the same as the pulsing switch opens the telephone line at the subscriber's station. The circuit 70 is connected to a control apparatus including a series of stepping relays for controlling the dictating machine but which need not be herein described for the purposes of the present invention.

Figure 4:
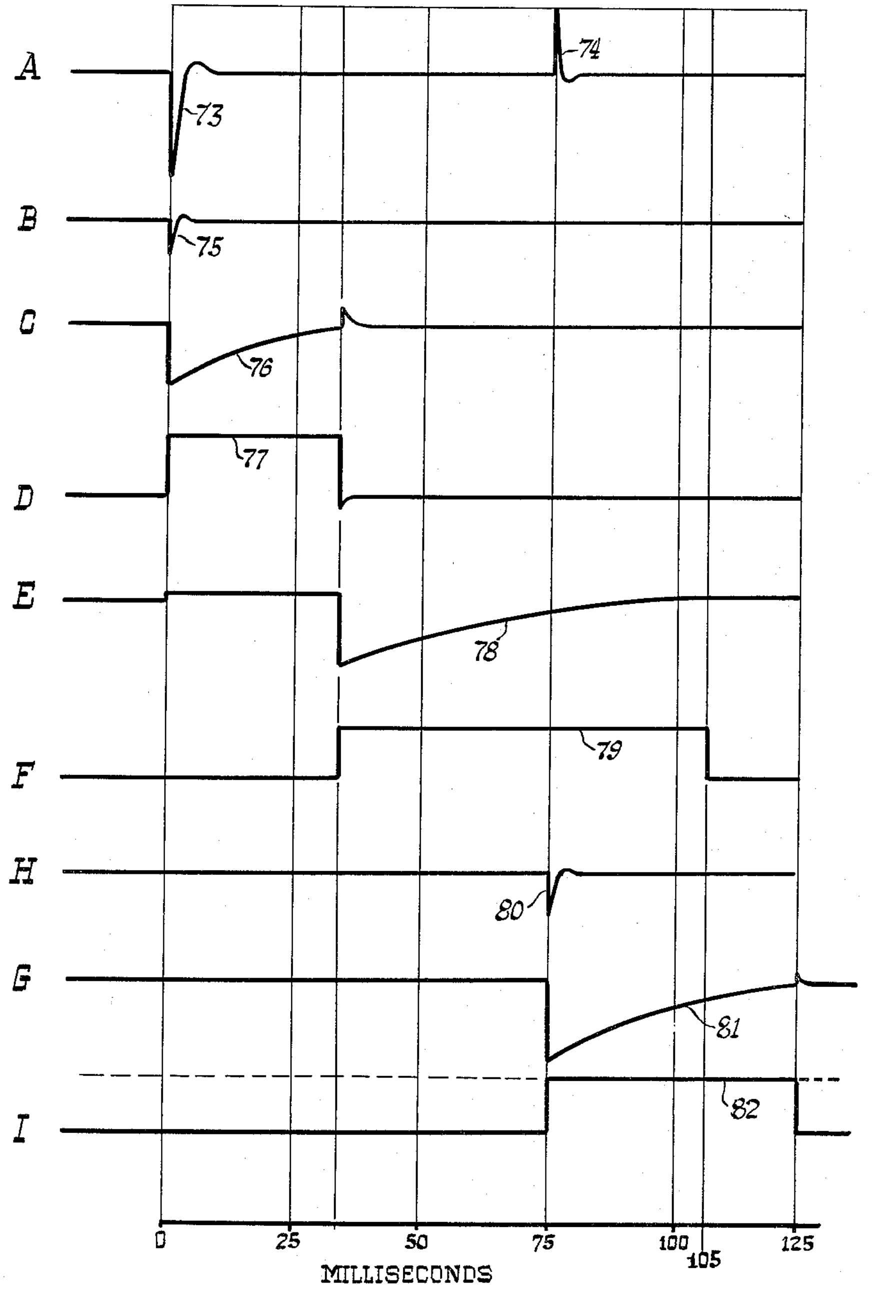
FIGURE 4 is a chart showing the time relation of significant voltages and power levels appearing at the successive points in the dial pulse restoring circuit.

The table in FIGURE 4 shows the relative timing of critical voltages and power levels in the pulse restorer upon a negative differential surge 73 being fed to the restorer followed by a positive surge 74 within a time interval greater than about 35 ms. and less than about 100 ms., as indicated by the curve A. The negative surge 73 renders the tube 33 momentarily conductive as indicated at 75 of curve B. This momentary conduction of tube 33 causes the grid of tube 38 to be shifted negative on an RC discharge curve for a period of about 35 ms. as indicated at 76 of curve C. During this same period the grid of tube 39 is held positive at a substantially fixed value as indicated at 77 of curve D. Starting with the return of the grid of tube 39 to normal value the grid of tube 46 is shifted negative on an RC discharge curve over a period of about 70 ms. as indicated at 78 of curve E. During this period the grid 3 of tube 51 is held positive at a substantially fixed value as indicated at 79 of curve F. Within this time interval the grid 1 of tube 51 is shifted momentarily positive as indicated at 74 of curve A. The resultant coincident application of positive voltages on both grids 1 and 3 of tube 51 causes this tube to be momentarily conductive as indicated at 80 of curve G. The momentary conductivity of tube 51 shifts the grid of tube 58 negative on an RC discharge curve over a period of about 50 ms. as indicated at 81 of curve H to render the tube 58 conductive over this time interval. This causes the grid of tube 59—which is normally held negative—to be shifted to a substantially zero value for the duration of this 50 ms. interval as indicated at 82 of curve I and this in turn causes the output relay 68 to be held operated throughout the same 50-ms. interval.

It will be observed that the present dial pulse restorer is sign-sensitive since the input tube responds only to surges of negative polarity corresponding to the leading differentials of original dial pulses, and the detector tube 51 responds only when each surge of negative polarity is followed by a surge of positive polarity corresponding to the trailing differential of an original dial pulse. Also, the input tube is biased to serve as an amplitude discriminator so that only the large differential surges of dial pulses—which are typically about five to ten times greater than the magnitude of the loudest speech signals—are effective to operate the pulse restorer. Still further, since the leading differential surge is utilized to produce a positive voltage on grid 3 of the detector tube 51 at a delayed time equal to the minimum duration of original dial pulses and this positive voltage on grid 3 is then maintained for a duration equal to the maximum tolerance or time duration of the original pulses, the tube 51 is utilized as a coincidence detector requiring that the time duration of the original pulses must be within prescribed limits in order to operate the pulse restorer.

The frequencies which make up the differential surges of original dial pulses lie in a lower frequency band principally below 100 c.p.s. but containing still substantial energy components up to 1000 c.p.s. If desired, a discrimination in favor of the frequency components of the differential surges of the dial pulses and against the speech frequency components may be obtained by interposing the aforementioned low-pass filter 26 between the telephone line 15 and the restorer 29.

Whenever the dictator hangs up his handset and thereby opens the telephone line to his telephone station, the relay 17 is dropped out to disconnect the dictating machine 13 and dial pulse restorer 29 from the telephone line. Also, as the relay drops out it closes the switch 21 to connect a low resistor 72 of about only 100 ohms from cathode of tube 59 to ground. This so reduces the plate voltage of the preceding tube 58 that this tube is rendered non-conducting. When this tube is rendered non-conducting the tube 59 loses its grid bias from the resistor 63 to render this tube conducting and to cause the relay 68 to be held operated. This holds the control circuit 70 open—which is the condition for placing the dictating machine in a neutral condition. Vice versa, as soon as a subscriber dials the line to which the dictating machine is connected, the resultant opening of the switch 21 causes the relay 68 to drop out and the circuit 70 to be held closed except when dial pulses are detected by the dial pulse restorer.

Without intending any unnecessary limitation thereto, the following typical values of the components of the restorer may be noted, where resistors are designated by the prefix R and condensers by the prefix C: R34, 2.2M; R35, 250K; R36, 4.7M; R40, 330K; R41, 6.8M; R42, 220K; R43, 33K; R44, 15K; R47, 5.6M; R54, 15K; R55, 1M; R56, 2.2M; R61, 1M; R63, 47K; R64, 15K; R65, 2.2K; R67, 10K; R72, .1K; C45, .02 mfd.; C50, .02 mfd.; C57, .1 mfd.; C60, .001 mfd.; C62, .1 mfd.; C66, 300 mfd.; C69, 1 mfd.; tubes 33 and 38, 12AX7; tubes 39 and 46, 12AX7; tube 51, 6BN6; tubes 58 and 59, 12AU7; and B+ potential, 150 v.

The particular embodiment of my invention herein shown and described is intended to be illustrative and not limitative of my invention since the same is subject to changes and modifications without departure from the scope of my invention which I endeavor to express according to the following claims.

I claim:

1. An apparatus for detecting in completed telephone circuits the oppositely polarized differential surges of original dial pulses at a calling station and for forming respective D.C. pulses in response thereto, said original pulses being characterized as having a time duration variable between predetermined limits, comprising an electronic gate circuit requiring two control voltages applied simultaneously thereto to open the same; means for producing said two control voltages responsive respectively to the leading and trailing differential surges of said original dial pulses including sign-sense detecting means responsive only to surges of opposite polarity occurring in the sequence of that of said leading and trailing differential surges, amplitude-discriminating means for rendering said detecting means responsive only to surges of a magnitude substantially greater than the peak voice signals in the telephone line, and timing means for delaying the first of said control voltages for the time of minimum duration of said original pulses and for maintaining said first control voltage for a duration equal to the maximum variation in time duration of said original pulses whereby a detection of an original dial pulse causes said two control voltages to occur coincidentally to open said gate circuit; and means responsive to each momentary opening of said gate circuit for producing a D.C. pulse having a time duration longer than the minimum duration of said original pulses and shorter than the maximum duration thereof.

2. The apparatus set forth in claim 1 including a low-pass filter in the transmission circuit between the apparatus and the telephone circuit for discriminating in favor of the differential surges of dial pulses and against the higher frequency speech components in the telephone circuit.

References Cited in the file of this patent

UNITED STATES PATENTS

| | | |
|---|---|---|
| 2,504,976 | Grieg | Apr. 25, 1950 |
| 2,577,827 | Tompkins | Dec. 11, 1951 |
| 2,634,346 | Hoeppner | Apr. 7, 1953 |
| 2,791,633 | Jones et al. | May 7, 1957 |